United States Patent
Marzorati et al.

(10) Patent No.: US 10,766,483 B2
(45) Date of Patent: Sep. 8, 2020

(54) ACTIVE VEHICLE VIRTUAL REALITY PREVENTION OF PREDICTIVE MOTION SICKNESS

(71) Applicant: International Business Machines Corporation, Armonk, NY (US)

(72) Inventors: Mauro Marzorati, Lutz, FL (US); Shikhar Kwatra, Morrisville, NC (US); Jeremy R. Fox, Georgetown, TX (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 25 days.

(21) Appl. No.: 16/109,690

(22) Filed: Aug. 22, 2018

(65) Prior Publication Data
US 2020/0062240 A1 Feb. 27, 2020

(51) Int. Cl.
*B60W 30/02* (2012.01)
*G05D 1/00* (2006.01)
*G05D 1/02* (2020.01)
*B60W 50/00* (2006.01)
*B60N 2/24* (2006.01)
(Continued)

(52) U.S. Cl.
CPC ......... *B60W 30/025* (2013.01); *B60N 2/0224* (2013.01); *B60N 2/24* (2013.01); *B60W 50/0097* (2013.01); *B60W 50/0098* (2013.01); *G05D 1/0088* (2013.01); *G05D 1/0212* (2013.01); *G06F 3/011* (2013.01); *B60W 2050/0014* (2013.01);
(Continued)

(58) Field of Classification Search
CPC .......... B60W 30/025; B60W 50/0097; B60W 50/0098; G05D 1/0088; G05D 2201/0212; G06F 3/011; B60N 2/0224
See application file for complete search history.

(56) References Cited

U.S. PATENT DOCUMENTS 7,437,219 B2  10/2008  Bos
7,717,841 B2  5/2010  Brendley et al.
(Continued)

FOREIGN PATENT DOCUMENTS

CN  204701483 U  10/2015

OTHER PUBLICATIONS

Bojarski, Mariusz, "End-to-End Deep Learning for Self-Driving Cars", NVIDIA Developer Blog, Aug. 17, 2016.

*Primary Examiner* — Rami Khatib
*Assistant Examiner* — Wilton E Liano
(74) *Attorney, Agent, or Firm* — North Shore Patents, P.C.; Michele Liu Baillie

(57) ABSTRACT

A negator module of a predictive motion system determines initial parameters for a passenger profile using a virtual reality system of an autonomous vehicle. The negator module receives upcoming driving conditions from an autonomous navigation system of the autonomous vehicle during a ride in which the passenger resides in a seat of the autonomous vehicle and uses the virtual reality system. Using a cognitive model, the negator module predicts a cognitive state of the passenger based on the passenger profile and the upcoming driving conditions. The negator module determines commands for actuators coupled to the seat and commands for the virtual reality system that match the predicted cognitive state of the passenger. The negator module sends the commands to the actuators and the virtual reality system to be executed.

12 Claims, 3 Drawing Sheets

(51) Int. Cl.
 *G06F 3/01* (2006.01)
 *B60N 2/02* (2006.01)
(52) U.S. Cl.
 CPC . *B60W 2050/0089* (2013.01); *B60W 2540/22* (2013.01); *G05D 2201/0212* (2013.01)

(56) References Cited

U.S. PATENT DOCUMENTS

| | | |
|---|---|---|
| 7,722,526 B2 | 5/2010 | Kim |
| 2015/0097864 A1* | 4/2015 | Alaniz .................. G06T 19/006 345/633 |
| 2017/0103571 A1* | 4/2017 | Beaurepaire ............. G09B 9/02 |
| 2017/0129335 A1 | 5/2017 | Lu et al. |
| 2017/0136842 A1 | 5/2017 | Anderson et al. |
| 2017/0285732 A1* | 10/2017 | Daly ........................ G06F 3/011 |
| 2017/0291538 A1 | 10/2017 | Sivak et al. |
| 2017/0313326 A1 | 11/2017 | Sweeney et al. |
| 2018/0040163 A1* | 2/2018 | Donnelly ................. G06F 3/012 |
| 2018/0089901 A1 | 3/2018 | Rober et al. |
| 2018/0096501 A1* | 4/2018 | Anderson .............. G06T 11/60 |
| 2018/0357836 A1* | 12/2018 | Ishiguro .................. G06T 19/20 |
| 2019/0176837 A1* | 6/2019 | Williams ................ G06F 3/165 |
| 2020/0041997 A1* | 2/2020 | Tuukkanen .............. A61B 5/18 |

* cited by examiner of the seat 104 and to actuators 109 that can move the seat 104. The predictive motion system 100 has access to a
ACTIVE VEHICLE VIRTUAL REALITY PREVENTION OF PREDICTIVE MOTION SICKNESS

BACKGROUND

Some people experience motion sickness while passengers in moving vehicles, some more prone than others. When the vehicles are controlled by human drivers, these passengers can verbally communicate their propensity to experience motion sickness to the human drivers, and the drivers can adjust their driving to minimize or avoid motions that may cause the passengers discomfort. However, with autonomous vehicles, this is not possible.

SUMMARY

Disclosed herein is a method for predictive motion sickness and a computer program product and system as specified in the independent claims. Embodiments of the present invention are given in the dependent claims. Embodiments of the present invention can be freely combined with each other if they are not mutually exclusive.

According to an embodiment of the present invention, a negator module of a predictive motion system determines initial parameters for a passenger profile using a virtual reality system of an autonomous vehicle. The passenger profile is associated with a passenger in the autonomous vehicle. The negator module receives upcoming driving conditions from an autonomous navigation system of the autonomous vehicle during a ride. During the ride, the passenger resides in a seat of the autonomous vehicle and uses the virtual reality system. Using a cognitive model, the negator module predicts a cognitive state of the passenger based on the passenger profile and the upcoming driving conditions. The negator module determines a first set of commands for a set of actuators coupled to the seat and a second set of commands for the virtual reality system that match the predicted cognitive state of the passenger. The negator module sends the first set of commands to the set of actuators and the second set of commands to the virtual reality system to be executed.

In one aspect of the present invention, the first set of commands and the second set of commands negate movement effects of the autonomous vehicle.

DETAILED DESCRIPTION

Figure 1:
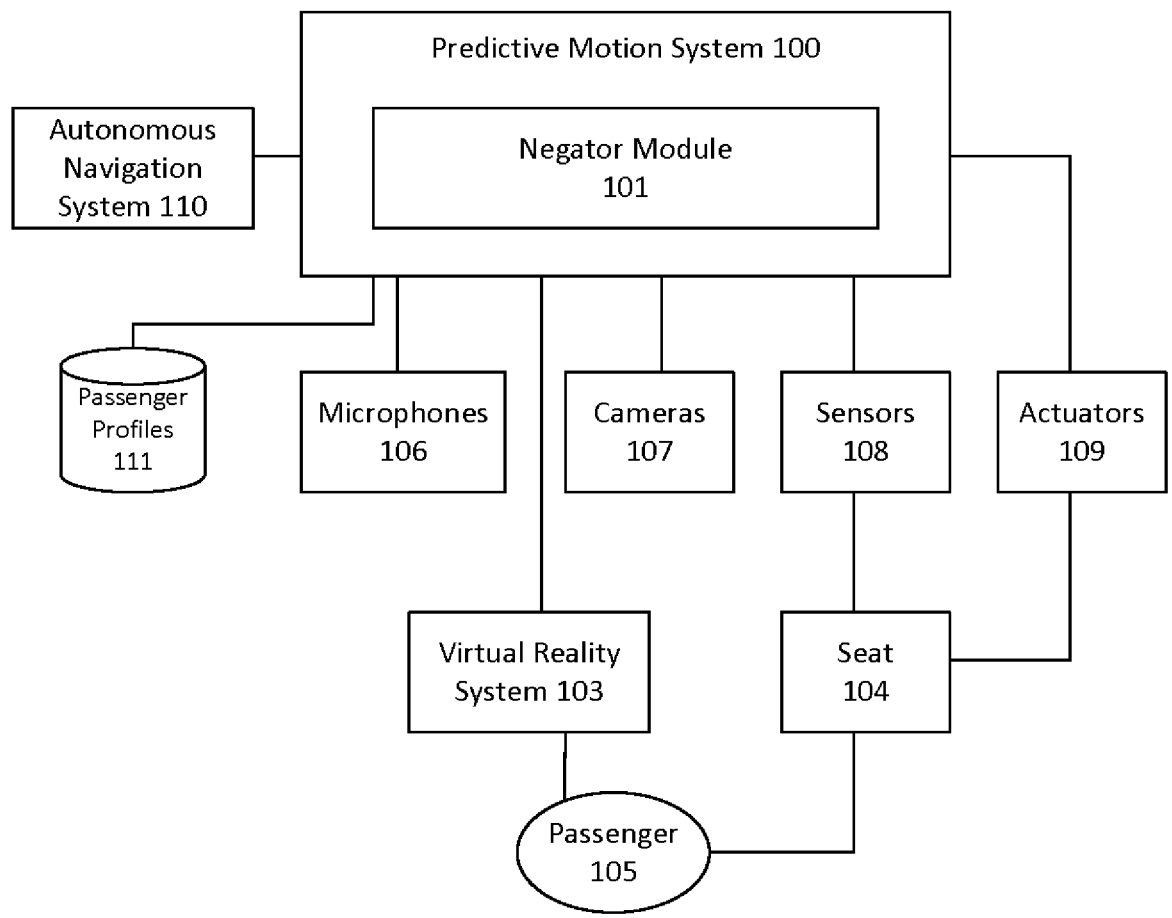
FIG. 1 illustrates an exemplary environment for predictive motion sickness according to some embodiments.

FIG. 1 illustrates an exemplary environment for predictive motion sickness according to some embodiments. The environment includes a predictive motion system 100 with a negator module 101, located in an autonomous vehicle with an autonomous navigation system 110. A passenger 105 occupies a seat 104 in the autonomous vehicle, and the seat 104 is coupled to sensors 108 that measures the movement of the seat 104 and to actuators 109 that can move the seat 104. The predictive motion system 100 has access to a passenger profile database 111, which stores passenger profiles, each associated with a specific passenger. The passenger profile associated with the passenger 105 describes how the passenger 105 responds to various movements of a vehicle, such as motions that are likely to result in motion sickness for the passenger 105. The negator module 101 is configured to receive data from the sensors 108 and optionally from camera(s) 107 configured to capture images of the passenger 105 and/or microphone(s) 106 configured to capture verbal sounds from the passenger 105. The negator module 101 further receives data from the autonomous navigation system 110 that describes the upcoming driving conditions. Any known technique for determining the upcoming road conditions may be used by the autonomous navigation system 110 of the vehicle. The vehicle further includes a virtual reality system 103, which is used by the passenger 105 while the vehicle is moving. The functionality of the various components of the environment are described further below with reference to FIG. 2.

Figure 2:
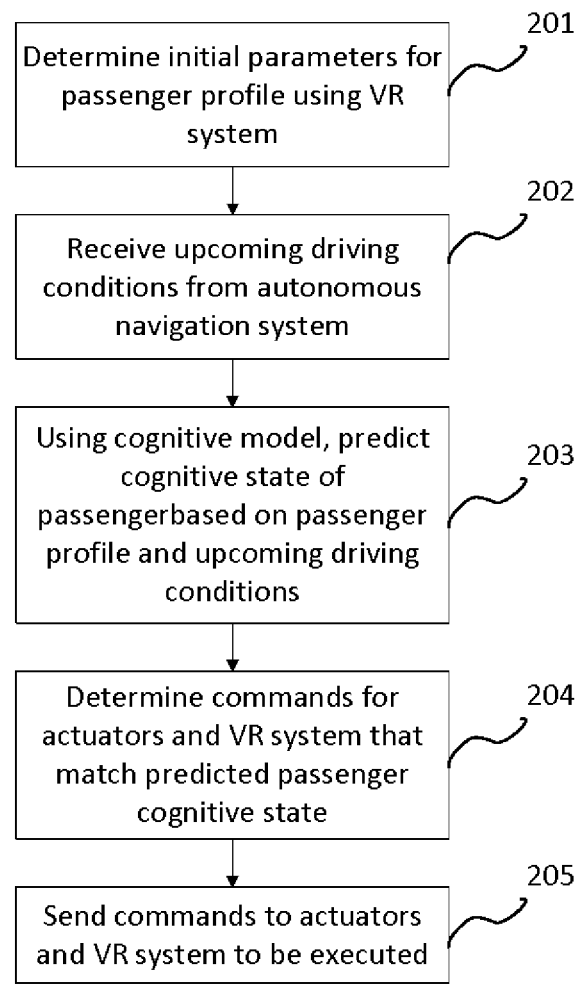
FIG. 2 illustrates a method for predictive motion sickness according to some embodiments.

FIG. 2 illustrates a method for predictive motion sickness according to some embodiments. The negator module 101 first determines the initial parameters for a passenger profile using the vehicles virtual reality (VR) system 103. In some embodiments, when the passenger 105 occupies the seat 104, the negator module 101 obtains the passenger's weight through the sensors 108 coupled to the seat 104. While the passenger 105 occupies the seat 104, the VR system 103 simulates various driving conditions, such as various road conditions, curvature of the terrain, speed of the vehicle, duration of travel, and G-force. The negator module 101 measures (via the sensors 108) the passenger's reaction to the simulation, such as change in weight distribution on the seat 104 associated with various types of driving conditions. The passenger 105 may be requested to perform specific movements, where the negator module 101 learns what measurements result from the specific movements. The negator module 101 can optionally use the cameras 107 to assess facial expressions to determine whether the passenger 105 is experiencing discomfort and record the driving conditions associated with the expressions. The negator module 101 can optionally use the microphones 106 to capture verbal cues from the passenger 105 that may indicate discomfort. The passenger 105 can also overtly indicate discomfort, either through specific verbal cues or by interfacing with a button or touch screen (not shown). The driving conditions and passenger reactions are stored as parameters for the passenger profile and associated specifically with the passenger 105. By determining the parameters for the initial passenger profile, the negator module 101 is trained to predict when the passenger 105 may experience motion sickness while riding in the vehicle.

Sometime after the parameters for the initial passenger profile are determined, the passenger 105 rides in the autonomous vehicle, sits in the seat 104, and uses the VR system 103 in the vehicle. The autonomous navigation system 110 controls the movement of the vehicle using known techniques. As part of the navigation, the autonomous navigation system 110 collects data concerning upcoming driving conditions. The negator module 101 receives these upcoming driving conditions from the autonomous navigation system 110 (202). The upcoming driving conditions can include, for example, road conditions (bumpy roads, slick wet roads, etc.), curvature of the terrain, speed of the vehicle (how fast outside objects appear to be moving, etc.), duration of travel, and G-force. The negator module 101 obtains the passenger profile, such as from a memory or storage (not shown) of the predictive motion system 100.

Using a cognitive model, the negator module 101 uses the passenger profile and the upcoming driving conditions to predict a cognitive state of the passenger 105 (203). For example, when the upcoming driving conditions will include a curvature of the road beyond a configured threshold, and the speed of the vehicle will be over another configured threshold, then the cognitive model predicts that a passenger with the passenger profile is likely to experience a cognitive state of "motion sickness".

The negator module 101 then determines the commands for the actuators 109 and the VR system 103 that match the predicted passenger cognitive state (204). For example, the negator module 101 determines that commands matching the cognitive state of "motion sickness" includes commands for the actuators 109 to create counter movements and for the VR system 103 to display certain vehicle movement to neutralize or negate the movement effects of the vehicle. The negator module 101 then sends the commands to the actuators 109 and commands to the VR system 103 to be executed (205). Blocks 202-205 are repeated throughout the ride. In this manner, the predictive motion system 100 compensates for the predicted cognitive state of a specific passenger 105. The commands issued by the negator module 101 varies between passengers according to their individual passenger profiles and real-time responses.

In some embodiments, a set of responses from the passenger 105, such as movement in the seat 104 and optionally physiological responses of the passenger 105, captured through the sensors 108, the microphones 106 and/or cameras 107, may be monitored during the ride, providing the negator module 101 with real-time feedback. The negator module 101 receives the movements and physiological responses as additional inputs to the cognitive model. In this manner, the negator module 101 considers real-time passenger responses in predicting the passenger cognitive state for upcoming driving conditions. These real-time passenger responses may also be used by the negator module 101 to determine the effectiveness of the commands. When the negator module 101 determines that the effectiveness fails to meet a configured threshold, the negator module 101 adjusts the commands accordingly. The passenger profile is also modified accordingly to increase its accuracy.

Optionally, the predictive motion system 100 may be configured for cognitive states other than "motion sickness". In an exemplary embodiment, the cognitive state is configured for "thrilling ride" or "smooth ride", where the commands for the actuators 109 and the VR system 103 amplifies the upcoming driving conditions or causes less motion (for a smoother ride).

An additional feedback mechanism (not shown) for the predictive motion system 100 may be implemented to understand whether the commands for the actuators 109 and/or the VR system 103 exceeds the capabilities of the actuators 109 and/or the VR system 103. When the feedback mechanism indicates that the commands exceeds their capabilities, the negator module 101 issues a request to the autonomous navigation system 110 to adjust the driving parameters to assist in matching the predicted cognitive state of the passenger 105.

Figure 3:
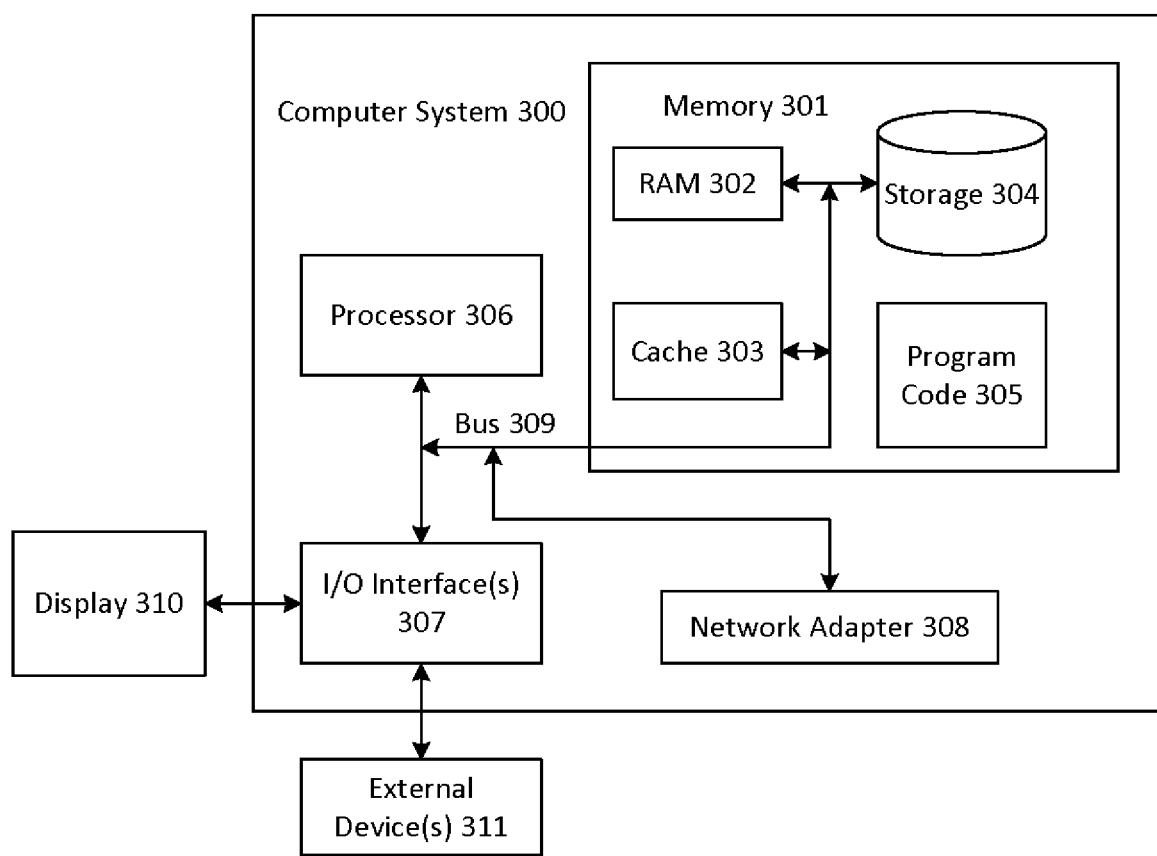
FIG. 3 illustrates a computer system, one or more of which is used to implement the predictive motion system according to some embodiments.

FIG. 3 illustrates a computer system, one or more of which is used to implement the predictive motion system 100 according to some embodiments. The computer system 300 is operationally coupled to a processor or processing units 306, a memory 301, and a bus 309 that couples various system components, including the memory 301 to the processor 306. The bus 309 represents one or more of any of several types of bus structure, including a memory bus or memory controller, a peripheral bus, an accelerated graphics port, and a processor or local bus using any of a variety of bus architectures. The memory 301 may include computer readable media in the form of volatile memory, such as random access memory (RAM) 302 or cache memory 303, or non-volatile storage media 304. The memory 301 may include at least one program product having a set of at least one program code module 305 that are configured to carry out the functions of embodiment of the present invention when executed by the processor 306. The computer system 300 may also communicate with one or more external devices 311, such as a display 310, via I/O interfaces 307. The computer system 300 may communicate with one or more networks via network adapter 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
before navigating in an autonomous vehicle by a specific passenger, training a prediction motion system to predict reactions of the specific passenger, comprising:
simulating, by a virtual reality system coupled to the prediction motion system, various driving conditions while the specific passenger resides in a seat of the autonomous vehicle;
measuring, by the prediction motion system, a set of reactions from the specific passenger to the simulated driving conditions; and
storing, by the prediction motion system, the simulated driving conditions and the set of reactions in a passenger profile associated with the specific passenger in a passenger profile database;
after training of the prediction motion system, receiving, by the prediction motion system from an autonomous navigation system of the autonomous vehicle, upcoming driving conditions for a ride, wherein the specific passenger is to be in the seat of the autonomous vehicle during the ride;
retrieving, by the prediction motion system, the passenger profile associated with the specific passenger from the passenger profile database;
inputting into a cognitive model, by the prediction motion system, the upcoming driving conditions, the simulated driving conditions in the passenger profile, and the set of reactions in the passenger profile;
obtaining, from the cognitive model by the prediction motion system, a prediction of a cognitive state that the specific passenger will have during navigation of the upcoming driving conditions;
in response to the prediction of the cognitive state, determining, by the prediction motion system, a first set of commands for a set of actuators coupled to the seat and a second set of commands for the virtual reality system that match the predicted cognitive state of the specific passenger; and
during the ride, executing the first set of commands by the set of actuators and executing the second set of commands by the virtual reality system.

2. The method of claim 1, wherein the first set of commands and the second set of commands negate movement effects of the autonomous vehicle.

3. The method of claim 1, further comprising:
  during the ride, capturing, by the prediction motion system, a set of responses from the specific passenger to the execution of the first set of commands and the second set of commands;
  determining, by the prediction motion system, an effectiveness of the first set of commands and the second set of commands using the cognitive model; and
  adjusting the first set of commands or the second set of commands based on the determination of the effectiveness.

4. The method of claim 1, further comprising:
  determining, by the prediction motion system, whether the first set of commands exceeds capabilities of the set of actuators or the second set of commands exceeds capabilities of the virtual reality system; and
  in response to determining the first set of commands exceeds the capabilities of the set of actuators or the second set of commands exceeds the capabilities of the virtual reality system, issuing a request to the autonomous navigation system, by the prediction motion system, to adjust a set of driving parameters to assist in matching the predicted cognitive state of the specific passenger.

5. A computer program product, the computer program product comprising a computer readable storage medium having program instructions embodied therewith, the program instructions executable by a processor to cause the processor to:
  before navigating in an autonomous vehicle by a specific passenger, train a prediction motion system to predict reactions of the specific passenger, comprising:
    simulate various driving conditions using a virtual reality system while the specific passenger resides in a seat of the autonomous vehicle;
    measure a set of reactions from the specific passenger to the simulated driving conditions; and
    store the simulated driving conditions and the set of reactions in a passenger profile associated with the specific passenger in a passenger profile database;
  after training of the prediction motion system, receive, from an autonomous navigation system of the autonomous vehicle, upcoming driving conditions for a ride, wherein the specific passenger is to be in the seat of the autonomous vehicle during the ride;
  retrieve the passenger profile associated with the specific passenger from the passenger profile database;
  input into a cognitive model the upcoming driving conditions, the simulated driving conditions in the passenger profile, and the set of reactions in the passenger profile;
  obtain, from the cognitive model, a prediction of a cognitive state that the specific passenger will have during navigation of the upcoming driving conditions;
  in response to the prediction of the cognitive state, determine a first set of commands for a set of actuators coupled to the seat and a second set of commands for the virtual reality system that match the predicted cognitive state of the specific passenger; and
  during the ride, execute the first set of commands by the set of actuators and execute the second set of commands by the virtual reality system.

6. The computer program product of claim 5, wherein the first set of commands and the second set of commands negate movement effects of the autonomous vehicle.

7. The computer program product of claim 5, further comprising:
  during the ride, capture a set of responses from the specific passenger to the execution of the first set of commands and the second set of commands;
  determine an effectiveness of the first set of commands and the second set of commands using the cognitive model; and
  adjust the first set of commands or the second set of commands based on the determination of the effectiveness.

8. The computer program product of claim 5, further comprising:
  determine whether the first set of commands exceeds capabilities of the set of actuators or the second set of commands exceeds capabilities of the virtual reality system; and
  in response to determining the first set of commands exceeds the capabilities of the set of actuators or the second set of commands exceeds the capabilities of the virtual reality system, issue a request to the autonomous navigation system to adjust a set of driving parameters to assist in matching the predicted cognitive state of the specific passenger.

9. A system comprising:
  a virtual reality system;
  a set of actuators coupled to a seat of an autonomous vehicle; and
  a predictive motion system, wherein before navigating in the autonomous vehicle by a specific passenger, the predictive motion system is trained to predict reactions of the specific passenger, comprising:
    simulates, by the virtual reality system, various driving conditions while the specific passenger resides in a seat of the autonomous vehicle;
    measures a set of reactions from the specific passenger to the simulated driving conditions; and
    stores the simulated driving conditions and the set of reactions in a passenger profile associated with the specific passenger in a passenger profile database;
  wherein after training, the prediction motion system:
    receives, from an autonomous navigation system of the autonomous vehicle, upcoming driving conditions for a ride, wherein the specific passenger is to be in the seat of the autonomous vehicle during the ride;
    retrieves the passenger profile associated with the specific passenger from the passenger profile database;
    inputs into a cognitive model the upcoming driving conditions, the simulated driving conditions in the passenger profile, and the set of reactions in the passenger profile;
    obtains, from the cognitive model, a prediction of a cognitive state that the specific passenger will have during navigation of the upcoming driving conditions;
    in response to the prediction of the cognitive state, determines a first set of commands for a set of actuators coupled to the seat and a second set of commands for the virtual reality system that match the predicted cognitive state of the specific passenger;
  wherein during the ride, the set of actuators executes the first set of commands, and the virtual reality system executes the second set of commands.

10. The system of claim 9, wherein the first set of commands and the second set of commands negate movement effects of the autonomous vehicle.

11. The system of claim 9, wherein the prediction motion system further:

during the ride, captures a set of responses from the specific passenger to the execution of the first set of commands and the second set of commands;

determines an effectiveness of the first set of commands and the second set of commands using the cognitive model; and adjusts the first set of commands or the second set of commands based on the determination of the effectiveness.

12. The system of claim 9, wherein the prediction motion system further:

determines whether the first set of commands exceeds capabilities of the set of actuators or the second set of commands exceeds capabilities of the virtual reality system; and in response to determining the first set of commands exceeds the capabilities of the set of actuators or the second set of commands exceeds the capabilities of the virtual reality system, issues a request to the autonomous navigation system to adjust a set of driving parameters to assist in matching the predicted cognitive state of the specific passenger.

* * * * *